April 26, 1949.  L. D. WALTER  2,468,386
TOOL
Filed Aug. 23, 1946
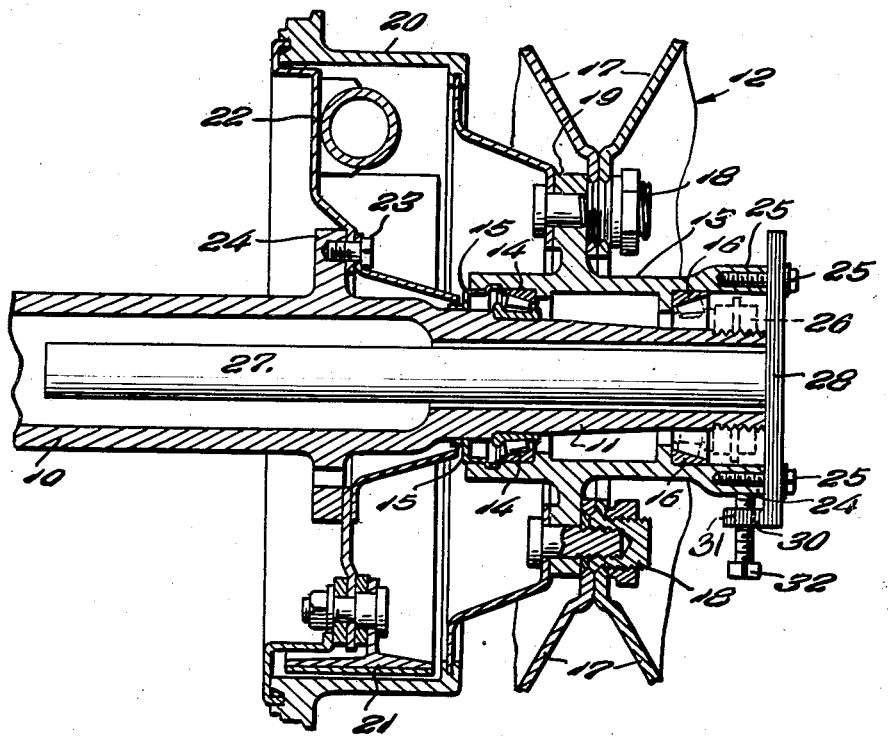
Fig. 1.
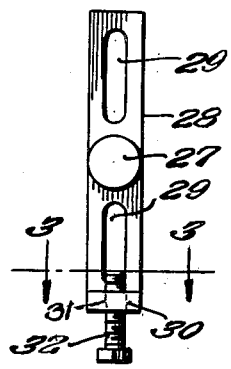
Fig. 2.
Fig. 3.
Inventor
Lawrence D. Walter
By Clarence A. O'Brien
and Harvey B. Jacobson
Attorneys Patented Apr. 26, 1949

2,468,386

UNITED STATES PATENT OFFICE 2,468,386

TOOL

Lawrence D. Walter, Lamar, Mo.

Application August 23, 1946, Serial No. 692,492

1 Claim. (Cl. 29—273)

This invention relates to a tool for facilitating the removal for repair, and the replacement of wheels, particularly of the dual type as used on heavy duty trucks and buses or where the type of wheel mounting known as the floating type is used in which the wheels rotate and are supported by the spindle ends of the axle housing and not on the driving axle which extends through the axle housing, but to which the wheels are connected for driving the same.

Heretofore, great manual effort has been required in removing and replacing wheels, particularly the driving wheels, of heavy duty trucks and buses, using a wheel mounting of the floating type, requiring that the vehicle be jacked up to raise the wheels off of the ground in order to remove the wheels including the bearing assembly and brake drum, which owing to the necessity of using great force, has frequently resulted in damage to the bearings and oil seal.

The object of the present invention is to provide a simple tool by which the wheels may be easily removed and replaced together with the outer bearings, with little manual effort and without injury to the bearings and oil seal, so as to facilitate the repair and replacement of parts of such heavy duty wheels employing a wheel mounting of the floating type in which the wheels are not mounted on the driving axle.

Another object of the invention is to provide a tool having an axle which is designed to extend into the tubular load axle and having means for connecting the same to the hub of the wheel upon removal of the usual driving axle and its flange or cap plate, so that the hub will be aligned axially and concentrically with the tubular axle housing, to facilitate replacement of the wheel in cooperation with the oil seal and its outer bearing without injury thereto, and completion of the assembly by insertion of the driving axle and connection thereof to the wheel hub upon removal of the tool.

Other objects and advantages reside in the details of construction and operation as more fully hereinafter described and claimed, reference being had to the accompanying drawings forming part hereof, wherein like numerals refer to like parts throughout, and in which:

Figure 1 is a sectional view showing a heavy duty truck or bus wheel of the floating type with the tool in position as used in removing and replacing the wheel and bearing assembly;

Figure 2 is an end elevation of the tool looking toward the shaft end, and

Figure 3 is a sectional view taken on the line 3—3 of Figure 2.

Referring to the drawings in detail, in which like reference characters designate corresponding parts throughout the several views, the numeral 10 designates the usual tubular axle housing extending from the differential drive housing, as employed in connection with a floating type of wheel mounting as used on heavy duty trucks, buses or the like having the spindle end 11 on which the dual wheel 12 is designed to turn at its hub 13, in connection with the inner bearing 14 adjacent to which is provided an oil seal 15 cooperating with the inner end of the tubular axle housing and the outer bearing 16. As shown, the wheel plates or discs 17, which support the usual wheel rims and tires, are bolted at 18 to the usual hub flange 19 and mounts the usual brake drum 20 engaged by the usual internal expanding brake shoes 21 carried by the stationary brake carrier plate or support 22 fixed as shown at 23 to the flange 24 of the tubular axle housing 10.

The outer end of the hub 13 is provided with the usual threaded bores for receiving the usual stud bolts 25 for securing the usual driving axle flange or cap plate thereto, for driving the wheels through the usual drive axle extending from the differential drive, while the outer bearing 16 is retained in position by the usual nuts 26.

The tool comprising the present invention, for the purpose of making it relatively simple to remove the wheel and assembly and replace the same together with its bearings so as to eliminate damage to said parts, consists of an elongated shaft 27 on one end of which is rigidly secured a cross head or bar 28 equidistantly of the ends of the latter and projecting upon opposite sides of the shaft. This cross head or bar 28 is provided on opposite sides of the shaft 27 with spaced longitudinal elongated slots 29 and one end is bent inwardly at right angles to form a lug 30 which is provided with a threaded opening 31 therethrough. This threaded opening 31 is designed to take a gauge screw 32 for adjustment against the outer end of the hub 13 to hold the shaft 27 down against the bottom of the tubular axle 10 on which the wheel rotates and which sustains the load of the vehicle. It will be noted that the shaft 27 is considerably longer than the hub 13.

In the use of the tool, with the wheel resting upon the ground, the usual driving axle flange bolts 25 are removed and then the driving axle section is removed to disengage the same from the usual differential drive gearing from within the tubular load axle 10 while the load is sustained upon the latter. This is done by merely pulling outwardly on the driving axle flange. The driving axle is then laid aside and by removing the outer bearing nuts 26, the outer bearing 16 can then be removed. The shaft 27 of the tool is then inserted in the load bearing or tubular axle 10 so as to lay on the bottom thereof. The tool is then secured in position to the outer end of the hub by means of two of the stud bolts 25 ordinarily employed to secure the driving axle flange in position, the stud bolts 25 being inserted through the elongated slots 29 with the cross head or bar 28 disposed vertically and against the outer end of the tubular axle 10. In this position, it will be noted that the end or lug 30 extends under the hub 13 at its outer end portion. The gauge screw 32 is then turned up against the hub 13 to positively hold the shaft 27 down against the bottom of axle housing 10. The load bearing tubular axle housing 10 is then raised with a lifting device or jack, until the tires are clear of the ground or floor, after which outward pull is exerted on the wheel while turning the latter back and forth until the innermost part of the hub 13 clears the end of the tubular axle housing 10. This can be done easily as the weight of the wheel is sustained by the shaft 27 bearing on the bottom of axle housing 10 within the latter. The lifting device or jack is then lowered to lower the tubular load bearing axle housing 10 until the wheel tires come to rest on the ground or floor. The bolts 25 are then removed to permit removal of the tool, after which the wheel can then be moved by rolling. In removing the wheel, it is only necessary to lift it about one inch or more off of the ground or floor, preferably placing two blocks of wood in front and in rear of the wheel or under the same to prevent rolling or movement of the wheel in either direction. These blocks of course are removed before the wheel is pulled outward off of the tubular axle housing by rotating the wheel from right to left and pulling outward thereof. After the necessary repair or replacement of parts is made, the wheel is placed in position, the shaft 27 of the tool inserted in the axle housing and secured by means of the cross head to the end of the hub while holding said shaft down on the bottom of said housing by adjusting the gauge screw against the hub. The tubular axle housing is then raised or lifted until the wheel is off of the floor or ground, and the wheel is then pushed inward with the bearings in position until the wheel assembly is in place on the spindle end of the tubular axle housing. This insures proper assembly of the parts without injury to the bearings or the oil seal, after which the wheel is secured in position by replacing the outer bearing and retaining nuts. The driving axle is then placed in position and the flange or cap plate thereof attached to the hub by all of the stud bolts 25 in the usual way.

Thus, it will be seen that I have provided a relatively simple device to greatly facilitate the removal and replacement of the wheels of heavy duty trucks, buses or the like employing a floating type of wheel mounting in connection with a tubular load bearing axle and a driving axle which does not support the load, and that the removal and replacement can be accomplished with a minimum of energy and manual effort, and without the use of great force, thus eliminating damage to oil seals, bearings, threaded parts and also eliminating lifting by the user of the tool.

It is also to be understood that the tool as described, is for the purpose of removing and replacing the wheels, together with the tires, brake drums and other parts as in assembly, on heavy duty trucks and buses, so as to lift the assembly while installing and hold the same in line with its spindle, thus eliminating damage to oil seals, bearings, threaded parts and requiring great manual effort on the part of the operator.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A tool to facilitate removal of a vehicle wheel from a tubular axle housing on which the hub of said wheel is journaled, comprising an elongated shaft adapted to be loosely received in the axle housing, and means to detachably and rigidly secure an end of said shaft to the outer end of the wheel hub with the shaft disposed within and against the bottom of the axle housing to sustain the weight of the wheel when said axle housing is elevated to raise the wheel off of the ground, said shaft being of a length to partly remain in the axle housing and sustain the weight of the wheel until the wheel hub is completely removed from the axle housing, said means including a cross bar rigid with said end of the shaft and having longitudinally elongated slots therein at opposite sites of said shaft adapted to receive stud bolts ordinarily used to secure the end flange of a drive axle to the hub, said cross bar having an inwardly directed lug on one end, and a set screw threaded through said lug for engagement with the underside of the hub to positively hold the shaft down against the axle housing.

LAWRENCE D. WALTER.

REFERENCES CITED

The following references are of record in the file of this patent:

UNITED STATES PATENTS

| Number | Name | Date |
| --- | --- | --- |
| 915,552 | Church | Mar. 16, 1909 |
| 955,790 | Givens | Apr. 19, 1910 |
| 1,227,457 | Langan | May 22, 1917 |
| 1,305,322 | Towler | June 3, 1919 |
| 1,431,378 | Derry | Oct. 10, 1922 |
| 1,935,678 | Valpey | Nov. 21, 1933 |